(12) United States Patent
Larson

(10) Patent No.: US 6,314,891 B1
(45) Date of Patent: Nov. 13, 2001

(54) PORTABLE PICNIC TABLE FOR TAILGATE PARTIES

(76) Inventor: Michael Larson, 418 Washington St., Scandia, KS (US) 66966

( * ) Notice: Subject to any disclaimer, the term of this patent is extended or adjusted under 35 U.S.C. 154(b) by 11 days.

(21) Appl. No.: 09/595,240

(22) Filed: Jun. 16, 2000

Related U.S. Application Data

(60) Provisional application No. 60/139,529, filed on Jun. 16, 1999.

(51) Int. Cl.[7] .................................................. A47B 23/00
(52) U.S. Cl. ......................... 108/44; 108/50.12; 108/99; 297/158.4; 224/521
(58) Field of Search ................................ 108/44, 42, 48, 108/50.12, 50.14, 92, 129, 134, 152, 115, 117, 59, 99; 292/158.4, 158.3, 169; 224/519, 521, 518; 280/762

(56) References Cited

U.S. PATENT DOCUMENTS

| Re. 10,825 | * | 4/1887 | Peard .................................... 297/109 |
| D. 158,160 | * | 4/1950 | Viola .................................... 108/99 X |
| D. 182,822 | * | 5/1958 | Kempner ........................ 297/158.4 X |
| D. 389,452 | | 1/1998 | Scott . |
| 1,976,839 | * | 10/1934 | Dobie ................................. 297/158.4 |
| 3,796,333 | | 3/1974 | Goldstein . |
| 4,606,575 | * | 8/1986 | Kodet .................................. 108/99 X |
| 4,615,559 | * | 10/1986 | Blondeau ......................... 297/169 X |
| 4,906,015 | | 3/1990 | LaCroix et al. . |
| 5,136,953 | | 8/1992 | Schmidt . |
| 5,203,266 | * | 4/1993 | Stevens ............................ 108/115 X |
| 5,368,209 | | 11/1994 | Hill . |
| 5,397,147 | | 3/1995 | Ducharme et al. . |
| 5,615,813 | | 4/1997 | Ouellette . |
| 5,678,743 | | 10/1997 | Johnson et al. . |
| 5,752,636 | | 5/1998 | Manley . |
| 5,752,639 | | 5/1998 | Rice . |
| 5,857,741 | | 1/1999 | Anderson . |
| 6,193,124 | * | 2/2001 | Brazil et al. ......................... 224/521 |

\* cited by examiner

Primary Examiner—Peter M. Cuomo
Assistant Examiner—Hanh V. Tran
(74) Attorney, Agent, or Firm—Jeffrey L. Thompson; Thompson & Thompson, P.A.

(57) ABSTRACT

A portable picnic table for tailgate parties is disclosed that attaches to a trailer hitch receiver of a vehicle. The table includes a frame having a transverse main beam, vertical supports extending upwardly from the main beam, and a mounting member extending forwardly from the main beam. The mounting member has a forward end adapted to be received in a trailer hitch receiver of a vehicle. First and second seats are attached by pivot connections to the respective ends of the main beam, and a table top is attached by pivot connections to the upper ends of the vertical supports. The seats and table top are each movable between a horizontal use position and a vertical transport position. The pivot connections are constructed such that the seats and table top must be lifted vertically from their vertical transport positions before they can be pivoted to their horizontal use positions. A trailer hitch receiver is provided at the rear of the mounting member for attaching a trailer or a support stand behind the table to stabilize the table during use.

15 Claims, 9 Drawing Sheets

PORTABLE PICNIC TABLE FOR TAILGATE PARTIES

RELATED APPLICATIONS

The present application claims the benefit of the Applicant's provisional patent application Ser. No. 60/139,529, filed Jun. 16, 1999.

BACKGROUND OF THE INVENTION

1. Field of the Invention

The present invention relates generally to table and chair assemblies and multiple purpose devices that attach to vehicle trailer hitches. In particular, the present invention relates to a portable picnic table that attaches to a trailer hitch of a vehicle for use at tailgate parties and the like.

2. Description of the Related Art

An activity that has become quite popular in recent years is the gathering of sports fans and spectators in parking lots and along roadsides to eat, drink and socialize prior to a sporting event. This activity has become known as "tailgate parties" and is particularly common at football games. Tailgate parties typically occur in the parking lots of sports arenas where dining tables are not available. Sports fans and spectators often bring food and beverages that are not available inside the sporting arenas and sit on their tailgates or car trunks to dine and socialize.

Tailgate parties normally take place in or around the vehicles of the participants. Some sports fans bring portable picnic tables and chairs in their vehicles to use at the parties, while others simply sit on their vehicles. It is also common for picnics similar to tailgate parties to be enjoyed in various remote areas, such as in parking lots of amusement parks, national forests, public picnic grounds, roadside parks, and the like.

Table and chair assemblies have been developed specifically for use at tailgate parties, picnics and the like. A typical tailgate table and chair assembly is disclosed, for example, in U.S. Pat. No. 5,857,741 issued to Thomas J. Anderson ("the '741 patent"). The '741 patent provides a vehicle-mounted table and chair assembly that mounts to the towing hitch of a vehicle and forms a table and seating device suitable for tailgate parties, camping, and the like. However, the table and chair assembly disclosed in the '741 patent suffers from a number of disadvantages. For example, the table and chair assembly of the '741 patent seats only two people, extends rearwardly from the vehicle a great distance, is difficult and cumbersome to place in a retracted or stowed position for transport, places a great deal of stress on the vehicle hitch during use, and is relatively uncomfortable to sit at due to its lack of foot room.

Other tables designed for tailgate parties are disclosed, for example, in U.S. Pat. Nos. 5,136,953 and Des. 389,452. These tables do not include seating arrangements and are not designed for attaching to a trailer hitch of a vehicle. Thus, these tables are relatively inconvenient to use at tailgate parties.

Other devices are known in the prior art that are designed to mount on a trailer hitch mount of a vehicle. These devices include, for example, a work table apparatus disclosed in U.S. Pat. No. 5,397,147, a multipurpose holding or carrying device disclosed in U.S. Pat. No. 5,752,639, truck bed extenders disclosed in U.S. Pat. Nos. 5,615,813, 5,752,636, and 5,678,743, and various cargo carrier platforms disclosed in U.S. Pat. Nos. 3,796,333, 4,906,015, and 5,368,209.

SUMMARY OF THE INVENTION

It is an object of the present invention to provide an improved table and chair assembly for use at tailgate parties that overcomes the disadvantages associated with the prior art devices described above.

More specifically, it is an object of the present invention to provide an improved picnic table assembly that attaches to a trailer hitch of a vehicle, that provides comfortable seating for up to four adults, that folds easily into and out of a compact transport position without removal from the trailer hitch, that does not prevent access to the trailer hitch for towing purposes, that does not obstruct the vehicle tail lights and license tag, that provides ample foot room during use, and that includes a ground support to minimize stress on the vehicle hitch and stabilize the table during use.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

Figure 1:
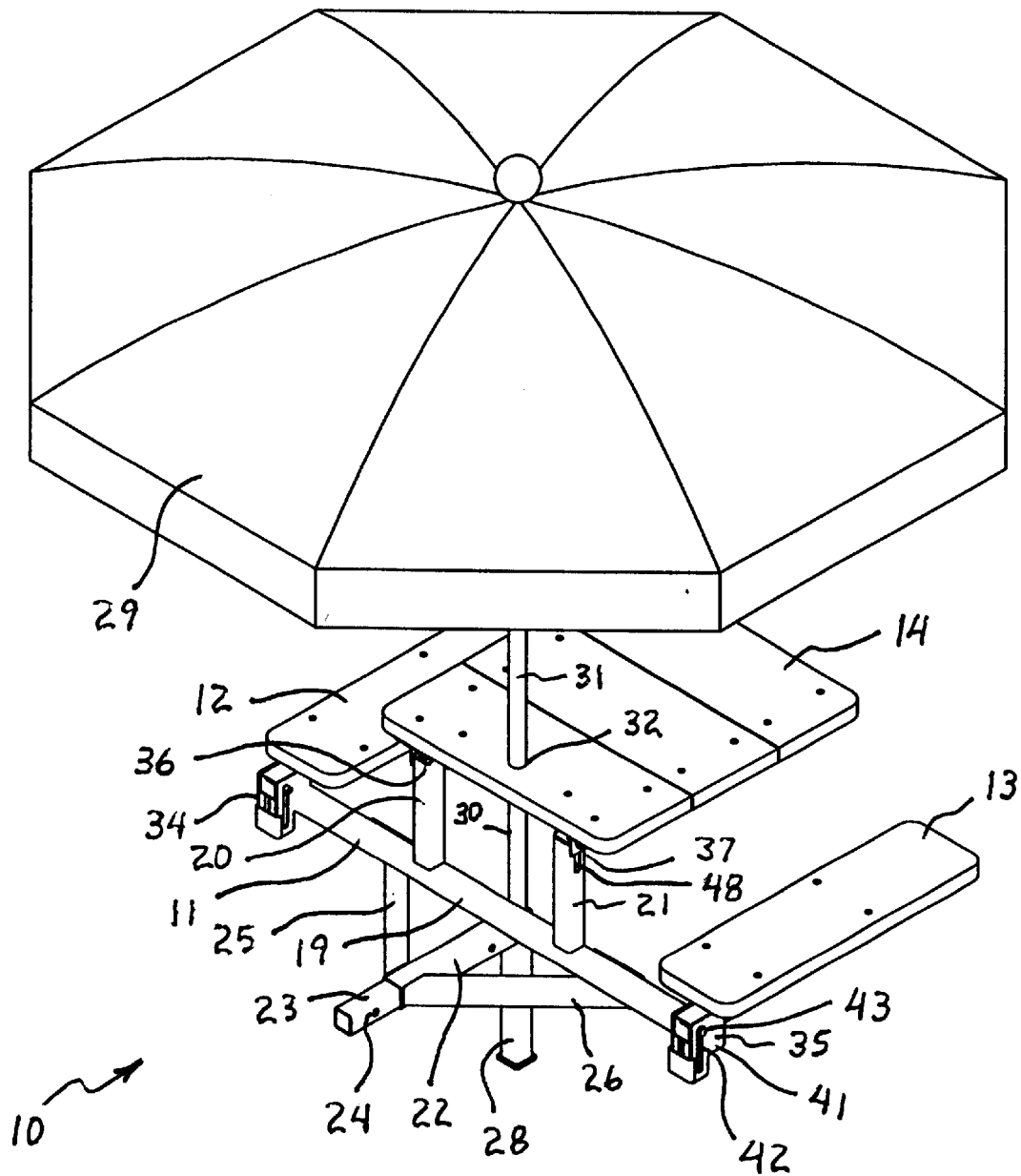
FIG. 1 is a perspective view of a portable table assembly according to the present invention.
Figure 2:
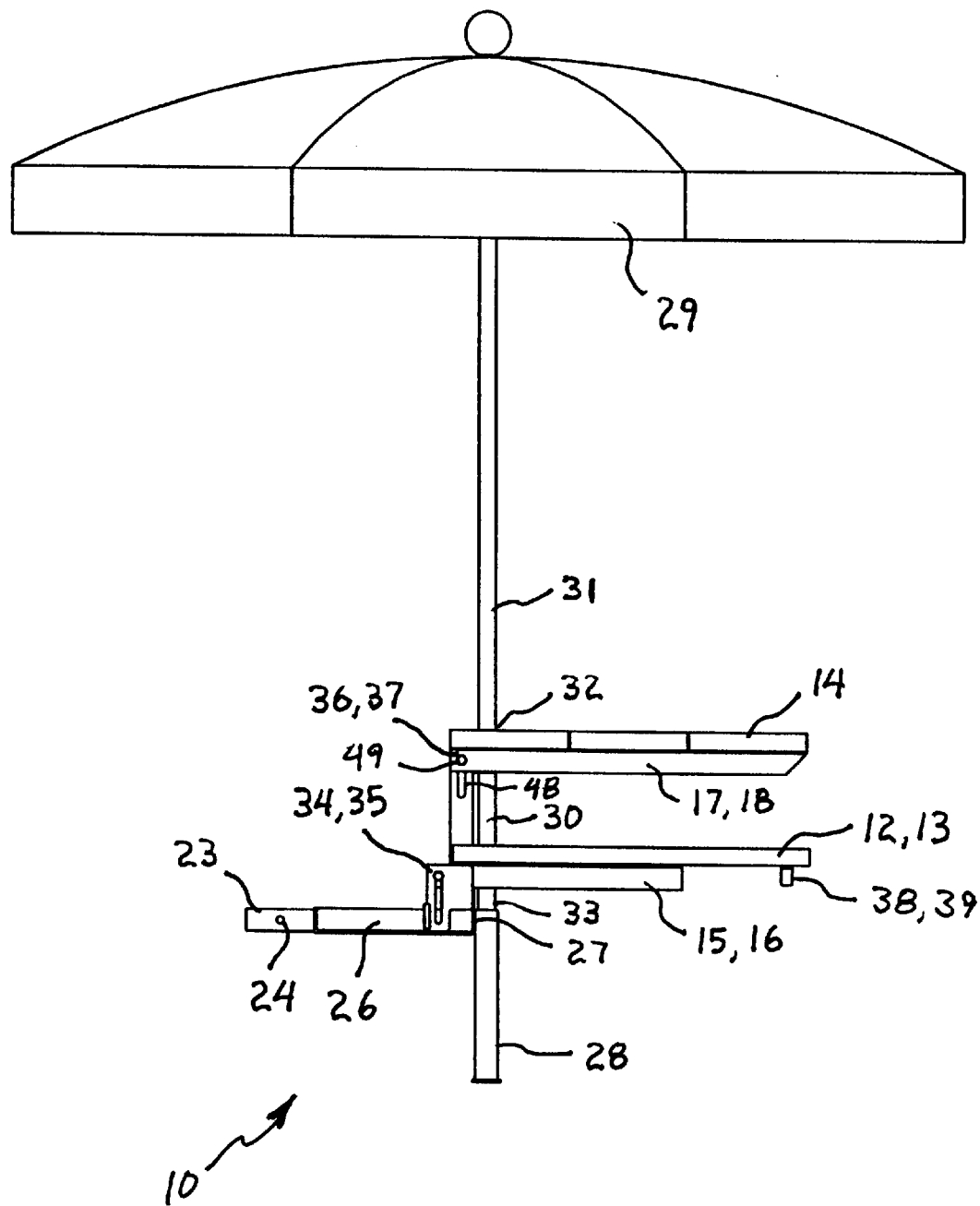
FIG. 2 is a side view of the portable table assembly according to the present invention.
Figure 3:
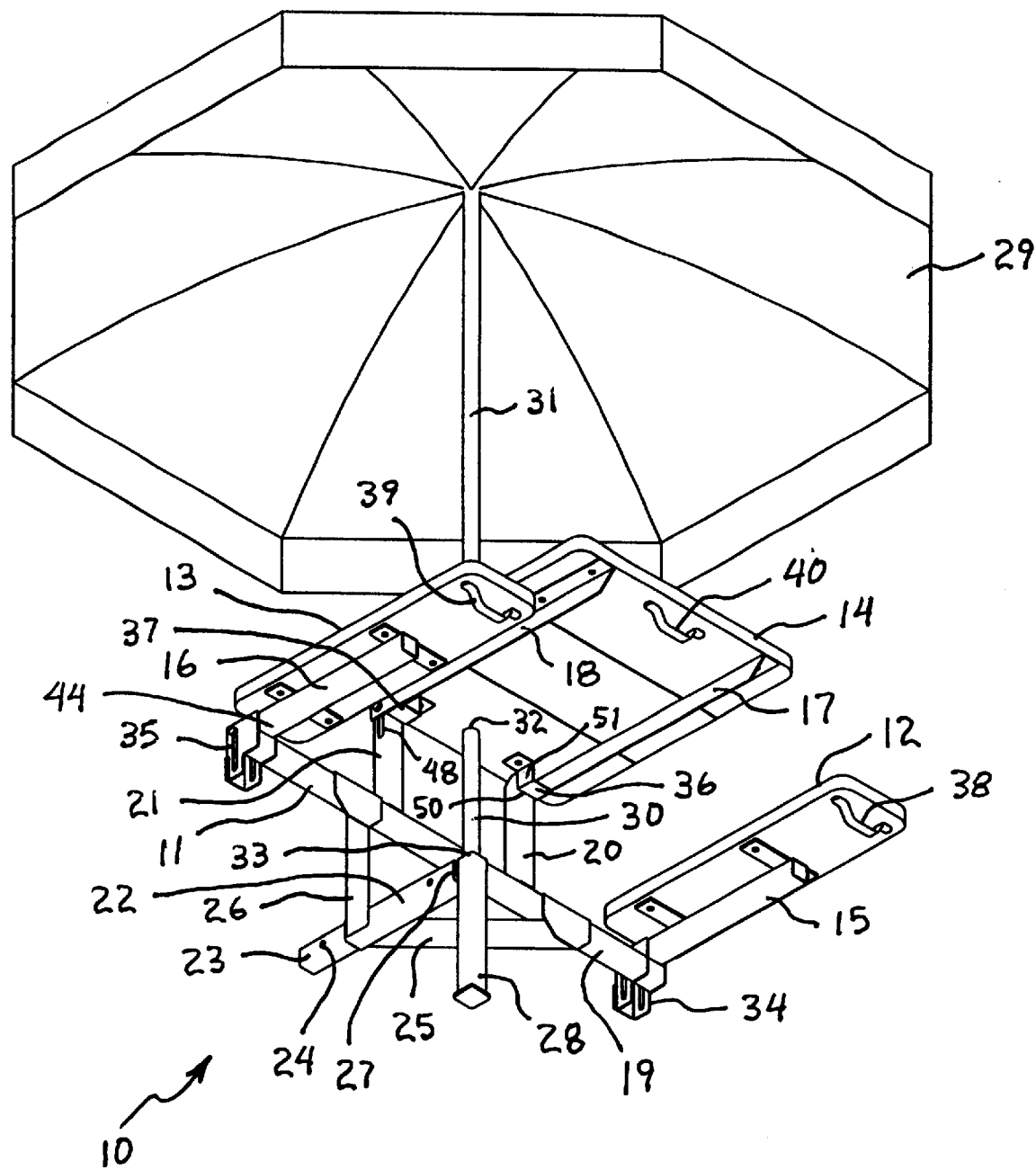
FIG. 3 is a perspective bottom view of the portable table assembly according to the present invention.
Figure 4:
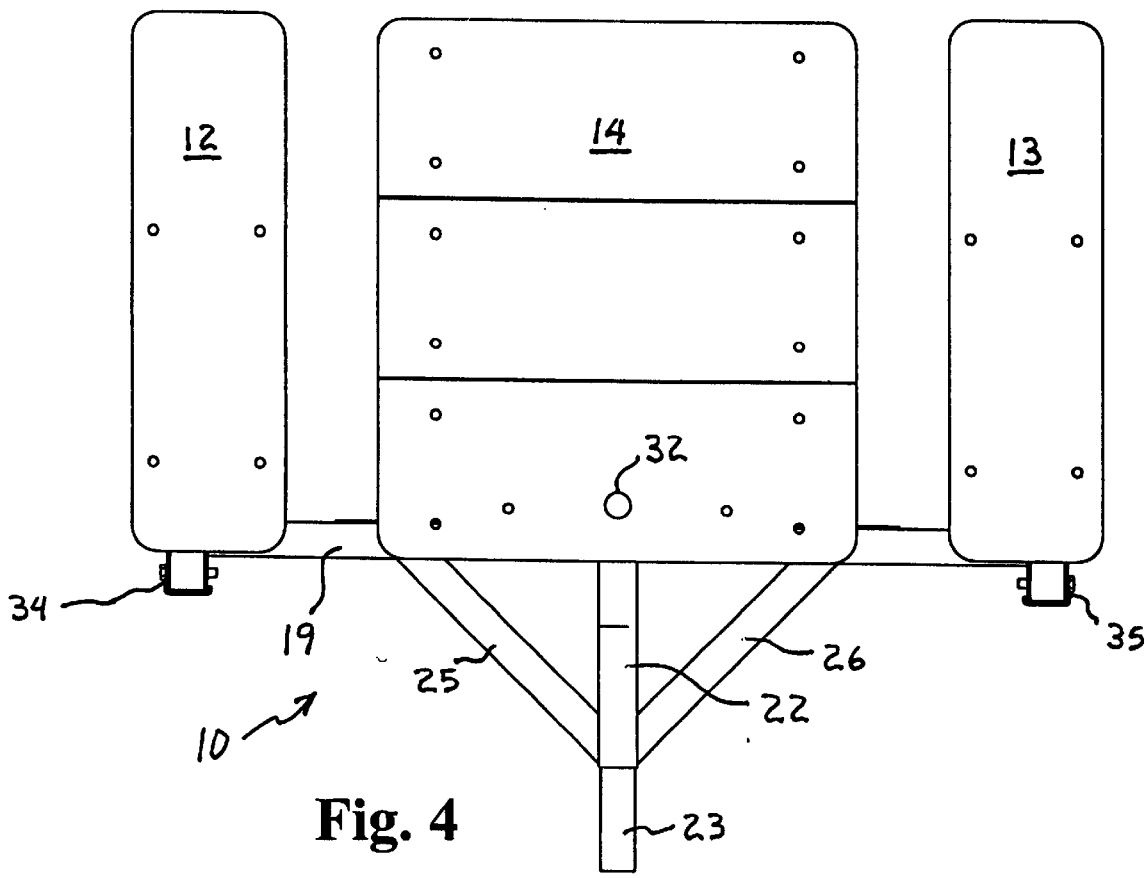
FIG. 4 a plan view of the portable table assembly according to the present invention.
Figure 5:
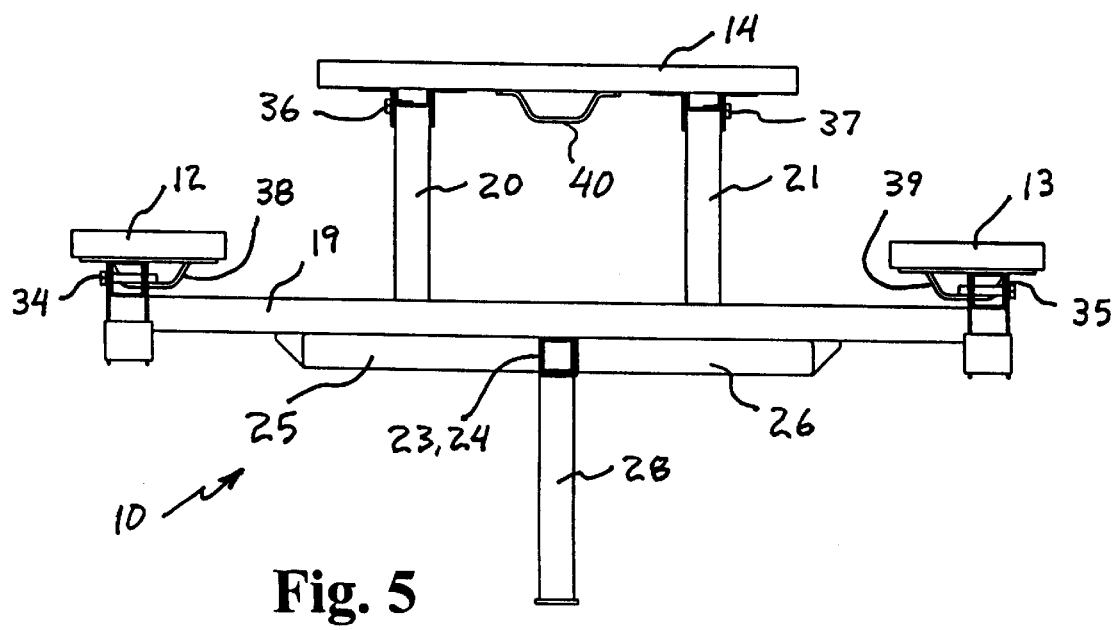
FIG. 5 is a front view of the portable table assembly according to the present invention.
Figure 6:
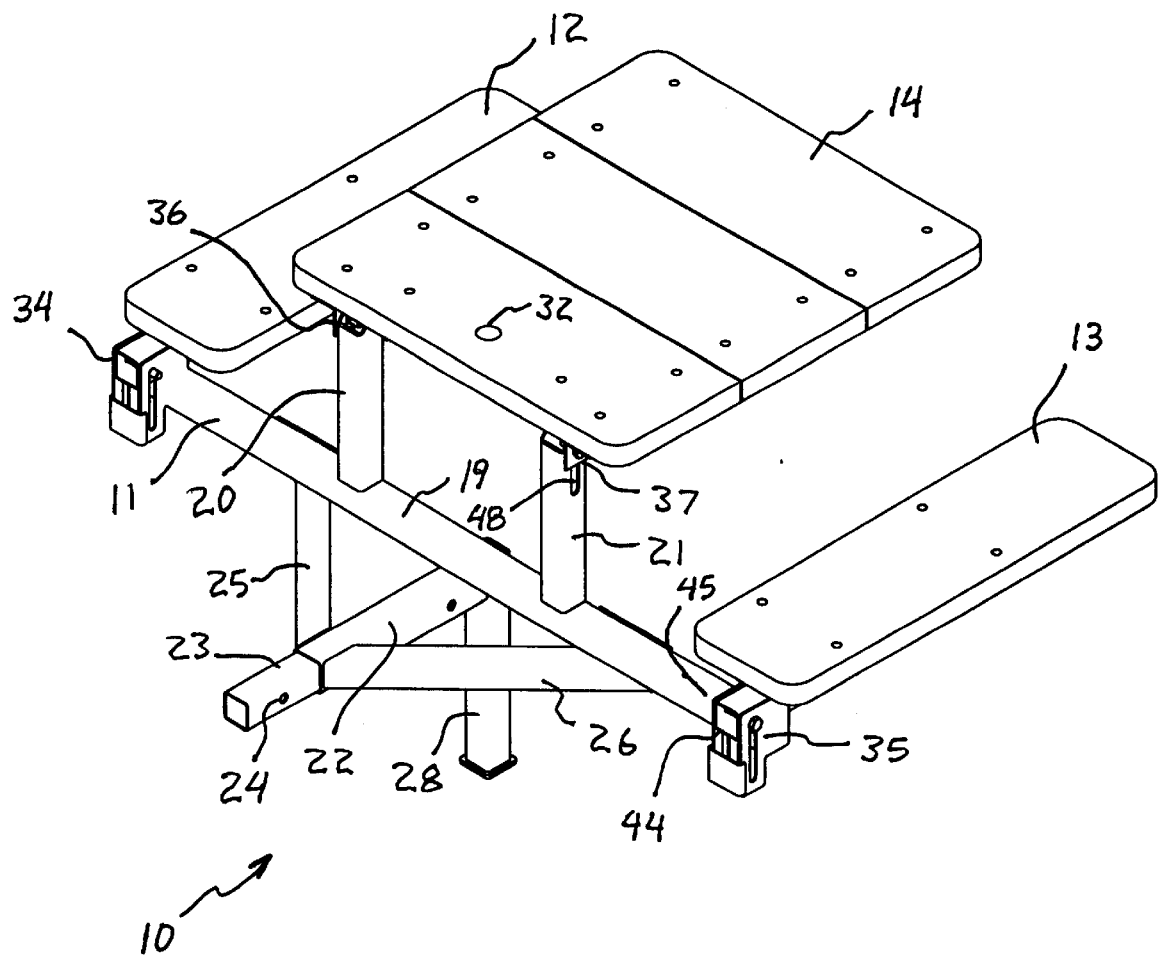
FIG. 6 is an enlarged perspective view of the table assembly shown in FIG. 1.

A first embodiment of the portable picnic table 10 for tailgate parties according to the present invention will now be described in detail with reference to FIGS. 1 to 9 of the accompanying drawings.

The portable picnic table 10 includes a frame 11 that supports first and second seats 12, 13 and a table top 14. The seats 12, 13 include generally rectangular members, such as plastic or wood, supported in a cantilever fashion by support members 15, 16 extending from the frame 11 during use. The seats 12, 13 are preferably wide enough to seat two adults on each side of the table top 14. The table top 14 includes a generally rectangular member formed of the same material as the seats 12, 13, and is supported in a cantilever fashion by support members 17, 18 extending from the frame 11 during use. In the folded down, ready-to-use position shown in FIG. 1, the seats 12, 13 and table top 14 have the general appearance of a conventional picnic table, except that they are supported by the frame 11 at only one end.

The frame 11 has a transverse main beam 19 with the first and second seats 12, 13 secured at each end thereof. A pair of vertical supports 20, 21 extend upwardly from the main beam 19 to support the table top 14 at a higher level than the seats 12, 13. A horizontal mounting member 22 extends forwardly from the main beam 19 and has a forward end 23 adapted to be received in a receiver of a conventional trailer hitch of a vehicle. A transversely extending hole 24 is provided in the forward end 23 through which a bolt, pin or the like can be passed to secure the mounting member 22 to the trailer hitch receiver of the vehicle.

A pair of stabilizing supports 25, 26 extend diagonally between the mounting member 22 and the main beam 19. The supports 25, 26 stabilize and strengthen the connection between the mounting member 22 and the main beam 19. The forward end 23 of the mounting member 22 extends forwardly of the supports 25, 26 to provide clearance for the mounting member 22 to be received in the receiver of the trailer hitch.

The mounting member 22 preferably has an open rear end that provides a trailer hitch receiver 27 at the rear of the picnic table 10. During use of the picnic table 10, a support stand 28 can be secured to the receiver 27 to rest on the ground and support the table 10. The support stand 28 functions to relieve some of the weight on the trailer hitch of the vehicle, and to stabilize the height of the table 10 when people are sitting on the seats 12, 13, particularly when four adults are seated at the table 10.

An umbrella 29 is attached to the table 10 and extends above the table top 14 to provide shade and protection from rain, snow and the like. The umbrella 29 can be attached to the table 10 by inserting the base end 30 of the umbrella support tube 31 through a receiver hole 32 formed in the table top 14. The base end 30 of the umbrella support tube 31 rests on an upper surface 33 of the support stand 28. It is also possible to mount a receiver tube to the table to receive and support the umbrella 29. However, such a receiver tube would cause the table 10 to be less compact in its folded-up, transport position. The umbrella 29 is easily assembled to the picnic table 10 during use by inserting the base end 30 of the support tube 31 into the receiver hole 32, and easily removed for transport by raising the support tube 31 out of the receiver hole 32.

The seats 12, 13 and table top 14 of the picnic table 10 can be folded easily and quickly between a compact, vertical transport position (FIGS. 7–9) and a horizontal, ready-to-use position (FIGS. 1–6). The seats 12, 13 and the table top 14 are each pivotally mounted to the main beam 19 by pivot connections 34, 35, 36, 37. The pivot connections each have a construction that allows the seats 12, 13 and table top 14 to be pivoted to a horizontal position during use, and a vertical position during transport. The pivot connections 34–37 are arranged to keep the seats 12, 13 and table top 14 held securely in a locked, vertical transport position (FIGS. 7–9) without requiring separate fastening means.

Figure 7:
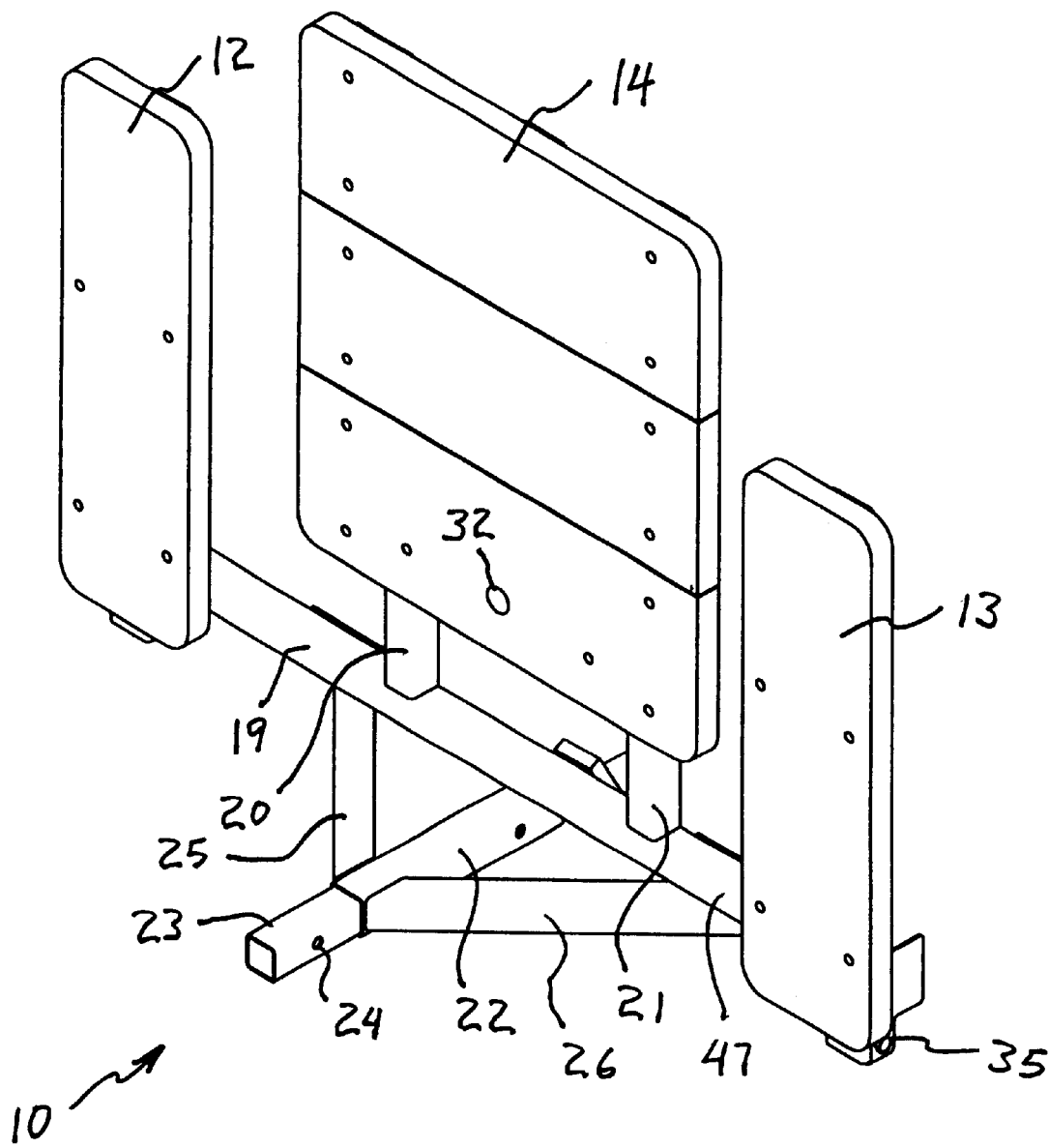
FIG. 7 a perspective view of the table assembly according to the present invention in folded-up, transport position.
Figure 8:
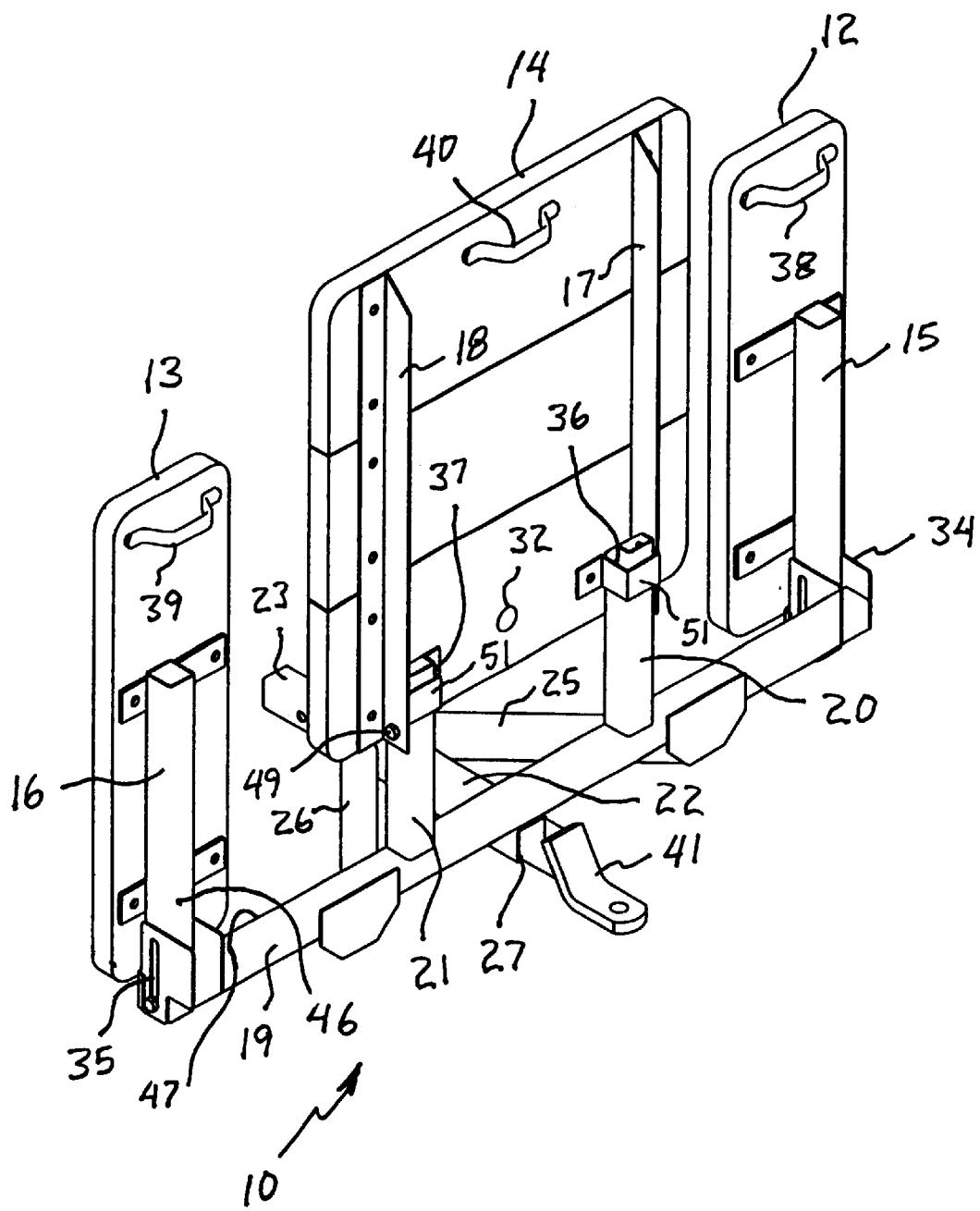
FIG. 8 is a perspective rear view of the table assembly according to the present invention in its folded-up, transport position.
Figure 9:
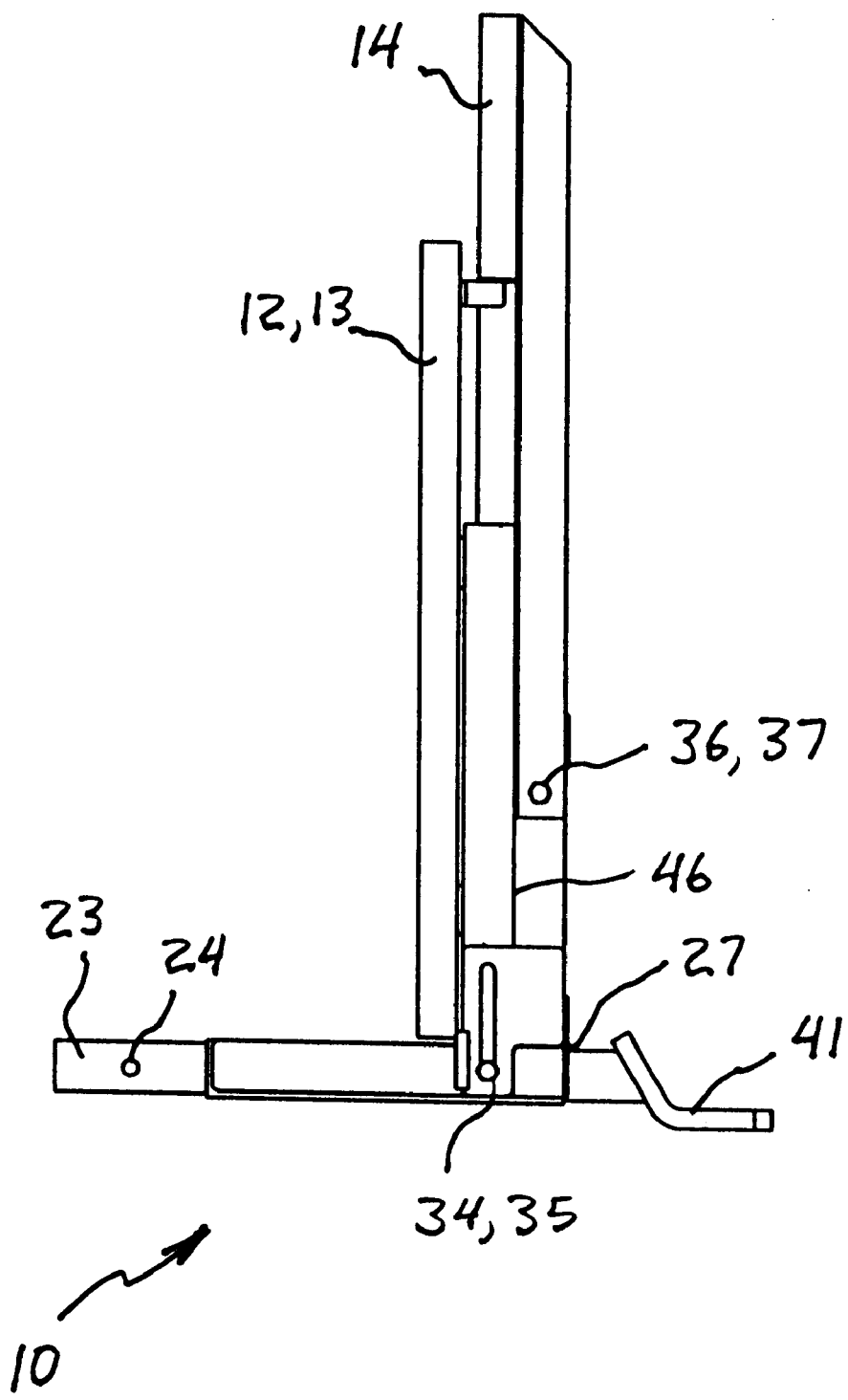
FIG. 9 is a side view of the table assembly according to the present invention in its folded-up, transport position.

The pivot connections 34, 35 for the seats 12, 13 each have a bracket 41 that receives an end of the support members 15, 16. The brackets 41 have vertically elongated slots 42 on each side of the support members 15, 16 that receive protruding ends of respective pin members 43 secured to the support members 15, 16. When the support members 15, 16 are in their horizontal seating position, as shown in FIGS. 1 to 6, the pin members 43 are at the top of the vertically elongated slots 42 and the bottom surfaces 44 of the support members 15, 16 rest on the upper surface 45 of the main beam 19. When the support members 15, 16 are pivoted toward their vertical positions, the protruding ends of the pin members 43 move downwardly in the elongated slots 42. Once the support members 15, 16 reach their vertical positions, they move downwardly a short distance by force of gravity until the protruding ends of the pin members 43 engage the bottom of the elongated slots 42. In this position, as shown in FIGS. 7 to 9, the rear side 46 of the support members 15, 16 engage a front side 47 of the main beam 19 and prevent the support members 15, 16 from pivoting back to their horizontal seating positions. The support members 15, 16 must be lifted a short distance in their vertical position before they can be pivoted back to their horizontal seating positions. Thus, the support members 15, 16 and the seats 12, 13 secured thereon can be maintained in their desired positions without the use of a separate locking or fastening means.

The pivot connections 36, 37 for the table top 14 operate in a similar manner to the pivot connections 34, 35 for the seats 12, 13, although their constructions are different. The pivot connections 36, 37 each have vertically elongated slots 48 formed in the upper portions of the vertical supports 20, 21 that receive respective pin members 49 secured to the support members 17, 18. When the support members 17, 18 are in their horizontal position, as shown in FIGS. 1 to 6, the pin members 49 are at the top of the vertically elongated slots 48 and the front edges 50 of the brackets 51 attached to the bottom surface of the table top 14 engage the vertical supports 20, 21 to maintain the table top 14 securely in its horizontal position. When the support members 17, 18 are pivoted toward their vertical positions, the pin members 49 move downwardly in the elongated slots 48. Once the support members 17, 18 reach their vertical position, they move downwardly a short distance by force of gravity until the protruding ends of the pin members 49 engage the bottom of the elongated slots 48. In this position, as shown in FIGS. 7 to 9, the brackets 51 slide over the top ends of the vertical supports 20, 21 and prevent the support members 17, 18 from pivoting back to their horizontal seating positions. The brackets 51 must be lifted a short distance to clear the top ends of the vertical supports 20, 21 before the table top 14 can be pivoted back to its horizontal position. Thus, the table top 14 can be maintained in its desired positions without the use of a separate locking or fastening means.

As explained above, the seats 12, 13 and table top 14 can be moved from their locked, vertical transport position by first lifting and then pivoting the seats 12, 13 and table top 14 about the pivot connections 34–37. Handles 38, 39, 40 are provided on a bottom surface of each of the seats 12, 13 and the table top 14 to facilitate lifting and folding the seats 12, 13 and table top 14 between the transport and ready-to-use positions.

When in the folded-up, transport position, the support stand 28 can be removed and a trailer hitch 41 inserted in the rear trailer hitch receiver 27 of the mounting member 22. The trailer hitch 41 can be used to connect a trailer or other accessories to the vehicle behind the portable picnic table 10 of the present invention.

The portable picnic table 10 of the present invention provides many advantages over the prior art. The picnic table 10 can be attached easily to a standard receiver hitch on a vehicle and transported to sporting events and the like. The picnic table 10 folds up into a very compact arrangement (approximately 18 inches behind the vehicle), and the trailer hitch receiver 27 at the rear of the picnic table frame 11 is available for connecting another trailer or accessory to the vehicle. The tail lights and license tag on most vehicles are visible when the table 10 is in its folded-up transport position. The picnic table 10 can be unfolded in less than a minute and will seat up to four adults. The open frame 11 of the picnic table 10 leaves ample leg room and does not interfere with the comfortable seating at the table.

Figure 10:
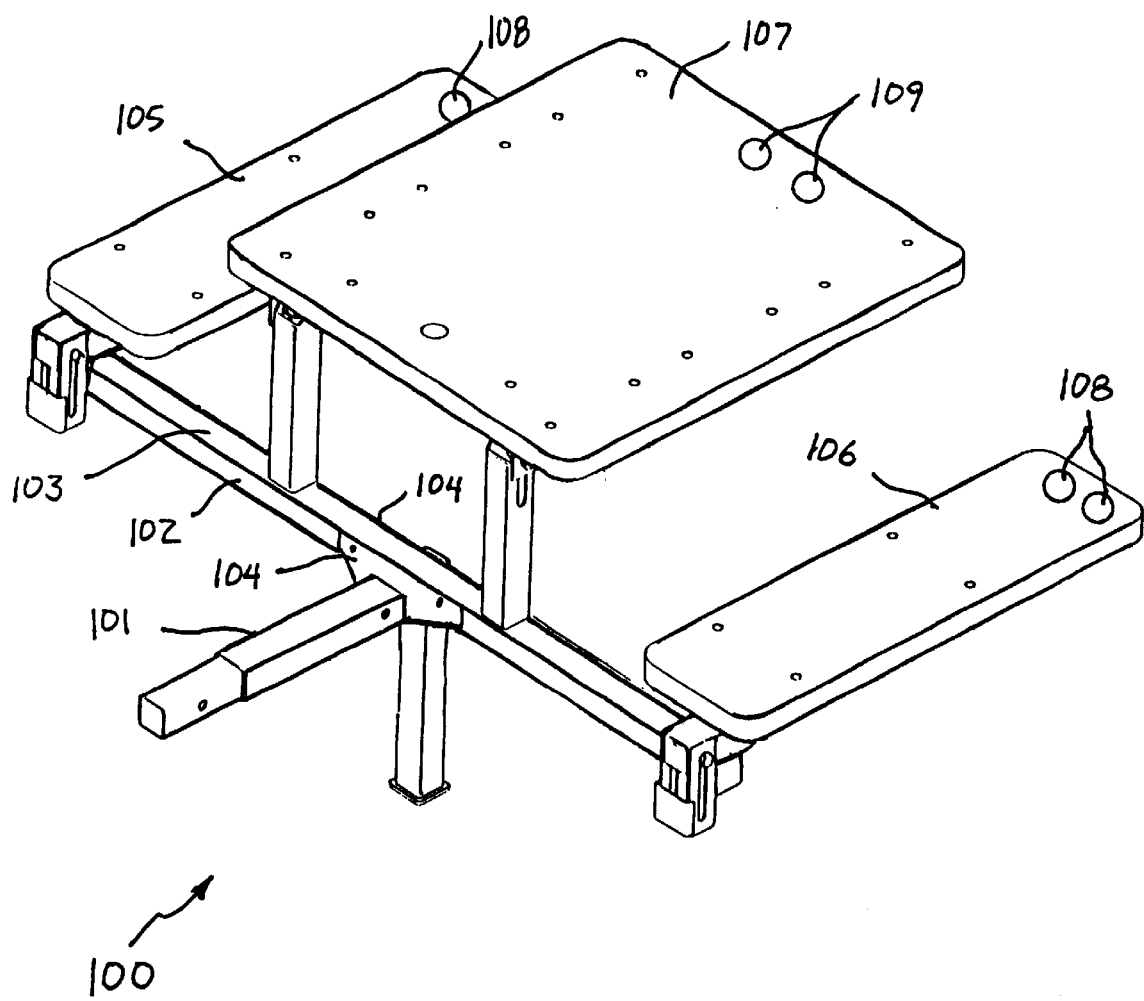
FIG. 10 is a perspective view of another preferred embodiment of a portable table assembly according to the present invention.

A portable picnic table 100 according to another embodiment of the present invention is shown in FIG. 10. The picnic table 100 is similar in most respects to the picnic table 10 shown in FIGS. 1 to 9 and described above, and a further description of the same features will therefore be omitted. The structural differences between the picnic table 100 shown in FIG. 10 and the picnic table 10 shown in FIGS. 1 to 9 will be described below.

The diagonal stabilizing supports 25, 26 used in the picnic table 10 to stabilize the mounting member 22 are not included in the picnic table 100. Instead, the mounting member 101 of the picnic table 100 is attached to the main beam 102 of the frame 103 using a pair of stabilizing plates 104 that sandwich the main beam 102 and are fixed securely to the mounting member 101. The stabilizing plates 104 used in the picnic table 100 provide generally the same function as the stabilizing supports 25, 26 in the picnic table 10.

The handles 38, 39, 40 used in the picnic table 10 to facilitate lifting and folding the seats 12, 13 and table top 14 are not used in the picnic table 100. Instead, the seats 105, 106 and table top 107 of the picnic table 100 are each provided near their rear ends with small openings 108, 109 that extend therethrough and provide the same function as the separately attached handles 38, 39, 40 of the picnic table 10. Also, the table top 107 of the picnic table 100 is formed of a single, large rectangular member as shown in FIG. 10, instead of a plurality of smaller rectangular members as shown in FIGS. 1 to 9. The seats and table top could also be formed using arcuate-shaped members to provide an oval-shaped table and seating arrangement.

It will be appreciated that the present invention is not limited to the exact constructions that have been described above and illustrated in the accompanying drawings, and that various modifications and changes can be made without departing from the scope and spirit of the invention. It is intended that the scope of the invention be limited only by the appended claims.

What is claimed is:

1. A portable table assembly, comprising:
   a frame having a transverse main beam, vertical supports extending upwardly from said main beam, and a mounting member secured to said main beam and extending generally forwardly from said main beam, said mounting member having a forward end adapted to be received in a trailer hitch receiver of a vehicle;
   first and second seats pivotally attached to first and second ends of said transverse main beam, respectively, said first and second seats each being movable between a generally horizontal use position and a vertical transport position; and
   a table top pivotally attached to said vertical supports, said table top being movable between a generally horizontal use position and a vertical transport position.

2. The portable table assembly according to claim 1, wherein said first and second seats and said table top are each pivotally movable between said horizontal use positions and said vertical transport positions about respective horizontal pivot axes that extend generally parallel to said transverse main beam.

3. The portable table assembly according to claim 1, further comprising means associated with each of said seats and said table top for securing said seats and table top in their vertical transport positions.

4. The portable table assembly according to claim 3, wherein said means for securing the seats and table top in their vertical transport positions comprises pivot connections that require the seats and table top to be lifted vertically from their vertical transport positions before they can be pivoted to their horizontal use positions.

5. The portable table assembly according to claim 1, wherein said mounting member has an open rear end that provides a rear hitch receiver at a rear side of the table assembly.

6. The portable table assembly according to claim 5, further comprising a support stand received in said rear hitch receiver and extending downwardly therefrom to engage the ground and provide a stabilizing support for the table assembly.

7. The portable table assembly according to claim 1, further comprising an umbrella assembly supported over the table top and having a support member inserted through a hole in the table top.

8. The portable table assembly according to claim 1, wherein said first and second seats are generally rectangular and extend rearwardly from said main beam in a cantilevered fashion when the seats are in their horizontal use positions.

9. The portable table assembly according to claim 1, wherein said table top is generally rectangular and extends rearwardly from said main beam in a cantilevered fashion when the table top is in its horizontal use position.

10. The portable table assembly according to claim 1, wherein said table top is elevated above said first and second seats when said table top and said seats are in their horizontal use positions.

11. The portable table assembly according to claim 1, further comprising handle means on each of said first and second seats and said table top for facilitating lifting and pivoting said seats and said table top between their horizontal use positions and vertical transport positions.

12. The portable table assembly according to claim 10, wherein said handle means comprises at least one opening extending through each of said seats at a location spaced from the pivotal attachments of the seats to the transverse main beam.

13. The portable table assembly according to claim 10, wherein said handle means comprises at least one opening extending through said table top at a location spaced from the pivotal attachment of the table top to the vertical supports.

14. The portable table assembly according to claim 10, wherein said handle means comprises at least one handle attached to respective bottom surfaces of each of said seats and said table top at locations spaced from the pivotal attachments of the seats and table top to said frame.

15. The portable table assembly according to claim 10, wherein said seats and said table top are generally coplanar with each other in their vertical transport positions, thereby forming a compact configuration for transport.

* * * * *